No. 771,592. PATENTED OCT. 4, 1904.
W. B. WAGGONER.
FRICTION DRAFT GEAR.
APPLICATION FILED NOV. 9, 1903.
NO MODEL. 2 SHEETS—SHEET 1.

Witnesses
Palmer A. Jones.
Georgiana Chace.

Inventor
William B. Waggoner
By Luther V. Moulton
Attorney

No. 771,592.

Patented October 4, 1904.

UNITED STATES PATENT OFFICE.

WILLIAM B. WAGGONER, OF CHICAGO, ILLINOIS, ASSIGNOR TO BUTLER DRAWBAR ATTACHMENT COMPANY, OF CLEVELAND, OHIO, A CORPORATION OF OHIO.

FRICTION DRAFT-GEAR.

SPECIFICATION forming part of Letters Patent No. 771,592, dated October 4, 1904.

Application filed November 9, 1903. Serial No. 180,374. (No model.)

*To all whom it may concern:*

Be it known that I, WILLIAM B. WAGGONER, a citizen of the United States, residing at Chicago, in the county of Cook and State of Illinois, have invented certain new and useful Improvements in Friction Draft-Gears; and I do hereby declare the following to be a full, clear, and exact description of the invention, such as will enable others skilled in the art to which it appertains to make and use the same.

My invention relates to improvements in friction draft-gears for railway-cars; and its object is to provide a simple and durable structure, to provide improved means for operating and releasing the friction mechanism, to equalize the wear upon the device, to provide means for readily repairing the same, and to provide the device with various new and useful features hereinafter more fully described, and particularly pointed out in the claims.

My invention consists, essentially, in the combination, with the plungers and springs operating the same, of bolts in the axis of the plungers and plates attached to the bolts and engaging the springs, whereby the friction is wholly released when the strain is taken off the draw-bar, of the construction whereby after the springs are compressed the plungers are engaged by the spring-compressing means and the friction-plates moved by the plungers, also in the spiral form of the friction plates or segments, whereby the wear is equalized on the same and on the interior of the case, the combination of detachable segmental portions to the friction-plates, whereby the device is more readily repaired, and in the various features of combination and arrangement, as hereinafter more fully described, reference being had to the accompanying drawings, in which—

Figure 1:
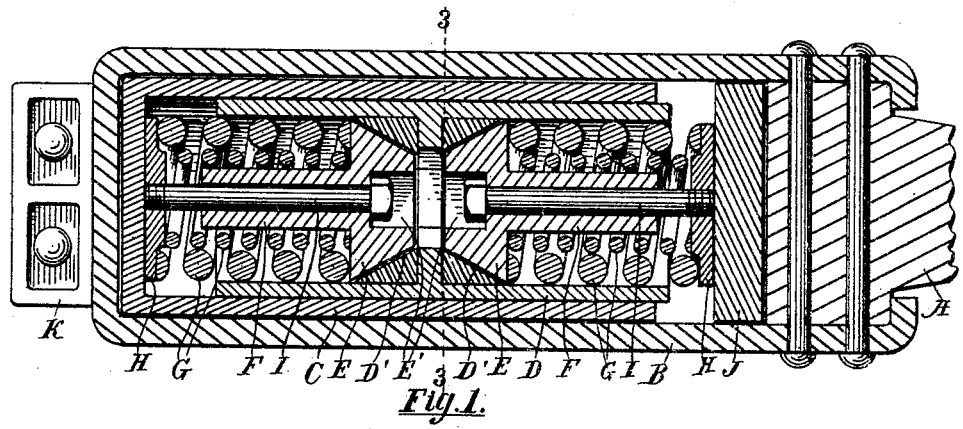
Figure 2:
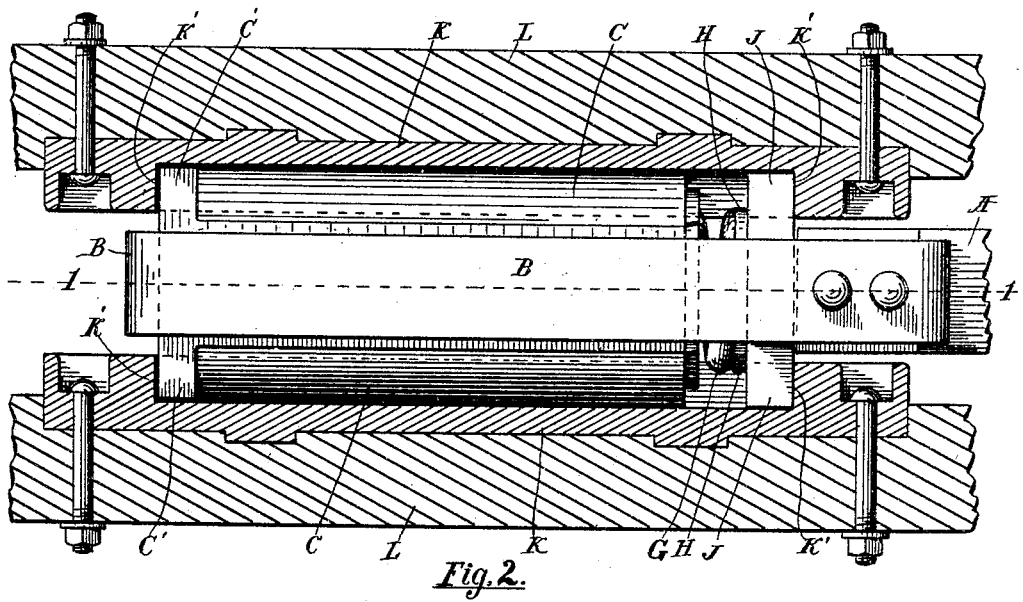
Figure 3:
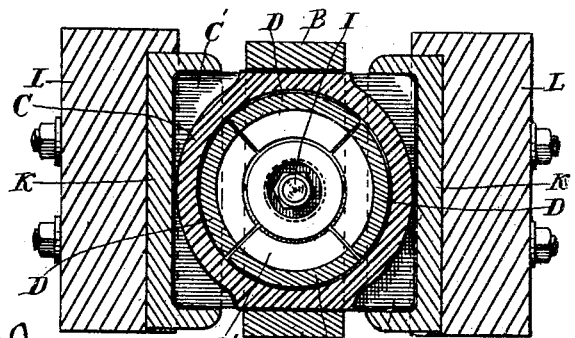
Figure 4:
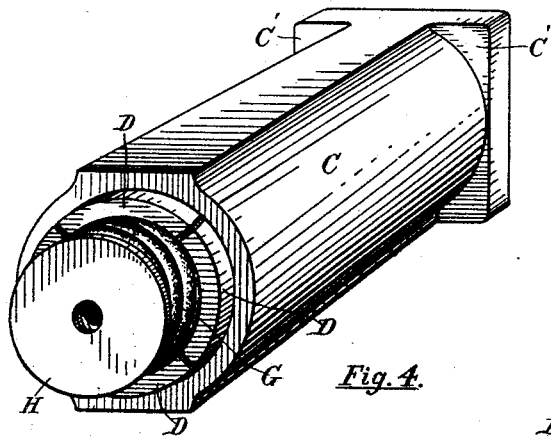
Figure 5:
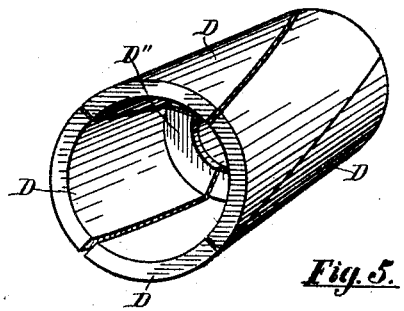
Figure 6:
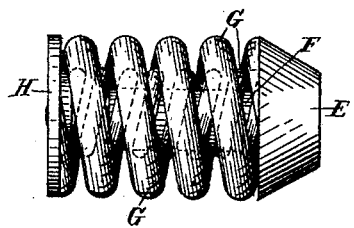

Figure 1 is a vertical section of a device embodying my invention, taken on the line 1 1 of Fig. 2; Fig. 2, a plan view of the same with the draft-timbers and draft-plates shown in horizontal section; Fig. 3, a transverse section of the same on the line 3 3 of Fig. 1; Fig. 4, a perspective detail of the case and contents; Fig. 5, a perspective of the friction-plates; and Fig. 6, a detail in side view of the friction-plunger with the spring, bolt, and plate as assembled.

Like letters refer to like parts in all of the figures.

A represents a portion of the shank of a draw-bar, and B the draw-bar strap slidably engaging opposite sides of the case C and engaging the rear end thereof.

D represents segmental friction-plates arranged within the case and engaging the inner surface of the same. Said friction-plates are made spiral or spirally divided, as shown in Fig. 5, whereby they tend to shift their position about the axis of the case from time to time, and thus equalize the wear on the various parts. Also as said plates slide longitudinally within the case the spiral spaces between the same will not traverse in the direction of their length, and therefore will not leave ridges on the interior of the case, as will occur with longitudinal spaces between such plates. The inner sides of these plates are provided with detachable inwardly-projecting segmental portions D', having inclined inner surfaces to engage the plungers, which latter are provided with truncated conical heads E, engaging said portions and centrally recessed, as at E', to receive the bolt-heads and provided with tubular stems F, in which the bolts I are freely movable longitudinally. Attached to the outer ends of the said bolts are plates H, and between these plates and the heads E are heavy spiral springs G. These friction-plungers, springs, bolts, and plates are in duplicate sets and oppositely arranged and act simultaneously to force the friction-plates D outward when the springs are compressed. The plates H respectively engage the bottom of the case C and the follower J, the bottom of the case being engaged by the strap B and the follower J being engaged by the draw-bar A.

L represents the draft-timbers of the car, to the adjacent sides of which timbers are securely fastened the draft-plates K, having shoulders K' engaging a square head C' on the case C and the follower-block J. This head and follower are each horizontally movable in suitable channels in the draft-plates K. The bolts I are of such length and so adjusted that when the strain is off the device the follower J and head C' will be near the respective shoulders K' on the draft-plates and the expansion of the springs will move the plates and bolts outward and the conical heads E will be withdrawn from contact with the surfaces of the portions D', and thus the mechanism fully released from frictional contact. The length of the stems F is such that when the springs are compressed the plates H will contact the stems, and thus slide the friction-plates in the case by forcing the plungers against the inclines of the portions D', and thus supplement the action of the springs in forcing the friction-plates against the case, as hereinafter described.

In operation, whether buffing or pulling, the springs are first compressed by the movement of the follower J and the case C toward each other. The springs force the truncated conical heads E against the inclined surfaces of the portions D, and thus force the friction-plates D against the inner surface of the case C. This friction tends to prevent the plates from sliding in the case and compression of the springs G adjacent to the closed end of the case. The outer springs will thus be first compressed. The outer plate H will then contact the end of the adjacent stem F, and the further compression of the inner springs G and the longitudinal movement of the friction-plates within the case will be effected by pressure delivered upon the stem of the outer plunger. This gives additional outward pressure on the plates D over and above that imparted by the springs, and thus greatly adds to the frictional resistance before completely forcing the device to the limit of its movements. I am thus able with a given spring resistance to accomplish an increased frictional resistance after the outer springs are fully compressed and to secure a novel and desirable mode of operation. When the strain is released and the springs expand, the bolts and the plates H are driven outward by the springs, and when the bolt-heads contact the bottom of the recesses the pressure of the springs is entirely counterbalanced, and by the inertia and reaction of the springs, bolts, and plates the heads are fully withdrawn from contact with the inclined surfaces of the friction-plates, and thus friction between the same and the case is entirely and effectually removed. As the friction-plates D move in the case the spiral form of the same tends to cause them to rotate slightly at each movement, and thus the wear is evenly distributed upon the various parts. When these friction-plates are moving within the case under heavy outward pressure, they will move longitudinally of their axis and the spiral seams between the plates will traverse diagonally instead of longitudinally, and thus no ridges will be formed on the case opposite the seams. Furthermore, in assembling the device the parts shown in Fig. 6 can be assembled with the springs under tension and limited to such extension that the device will be easily assembled. In the event that a friction-plate should be broken another can be readily inserted, and when the portions D' are worn or broken they may be removed and replaced at small cost without removing or renewing a friction-plate.

Having thus fully described my invention, what I claim, and desire to secure by Letters Patent, is—

1. In a friction draft-gear, the combination of a plunger, a plate, a bolt movably connecting the plunger and plate, and a spring between the plate and plunger and yieldingly forcing the plate and plunger apart.

2. In a friction draft-gear, the combination of a plunger having a truncated conical and recessed head, a tubular stem on the plunger, a bolt longitudinally movable in the stem and recess, a plate attached to the bolt, and a spring between the plate and head.

3. In a friction draft-gear, the combination of a plunger, a stem on the plunger, a spring surrounding the stem and normally extending beyond the end of the same, a plate engaging the spring, and also engaging the stem when the spring is compressed, and a bolt connecting the plunger and plate and limiting the expansion of the spring.

4. In a friction draft-gear, in combination with a cylindrical case, spirally-divided friction-plates in the case, and means for forcing the plates into frictional contact with the case.

5. In a friction draft-gear, a case, friction-plates slidable in the case, a plunger to operate the plates, a spring engaging and operating the plunger, means for compressing the spring, and a stem on the plunger engaged by said means, to move both the plunger and plates after the spring has been compressed.

6. In a friction draft-gear, a cylindrical case, spirally-divided friction-plates in the case, and having segmental portions provided with inclined surfaces, a plunger having a conical head to engage said surfaces, a plate, a bolt movably connecting the plate and head, a spring between the head and plate, and means for compressing the spring.

7. In a friction draft-gear, a case, friction-plates longitudinally movable in the case, inwardly-projecting and inclined surfaces on the plates, a plunger engaging said surfaces, a spring engaging the plunger and forcing the same against said surfaces, means for compressing the spring, and a stem on the plunger, and engaged by the said means after the spring has been compressed.

8. In a friction draft-gear, the combination of a cylindrical case, spirally-divided friction-plates in the case and having segmental portions provided with inclined inner surfaces, plungers having truncated conical and recessed heads and tubular stems, bolts longitudinally movable in the plungers, plates attached to the bolts, and springs between the plates and heads.

9. In a friction draft-gear, the combination of a cylindrical case, friction-plates in the case and having oppositely-inclined inner surfaces, opposing truncated conical plungers having oppositely-projecting stems, the stem adjacent to the follower-block being of such length that it will be engaged and drive the friction-plates into the case when the outer springs are compressed, and springs engaging the respective plungers.

10. In a friction draft-gear, the combination of a cylindrical case and a follower-block, a draw-bar engaging the follower-block and having a strap engaging the end of the case, friction-plates in the case and having opposing inclined inner surfaces, plungers having recessed truncated conical heads and tubular stems, bolts longitudinally movable in the plungers, plates attached to the outer ends of the bolts and adapted to contact the stems of the plungers when the springs are compressed, one of said plates engaging the follower-block, and the other of said plates engaging the bottom of the case.

11. In a friction draft-gear, in combination with friction-plates and plungers having truncated conical heads and means for operating the plungers, detachable inner portions on the friction-plates and having conical surfaces to engage the plungers.

12. The combination of draft-plates attached to the draft-timbers of a car and having opposing shoulders and channels, a follower-block movable in the channels and engaging the shoulders, a case having a square head movable in the channels and engaging the shoulders, a draw-bar engaging the follower-block and having a strap embracing the case and engaging the head thereof, friction-plates in the case and having oppositely-inclined inner surfaces, oppositely-acting plungers having recessed and truncated conical heads and tubular stems, bolts movable in the said plungers, plates attached to the bolts and respectively engaged by the follower-block and the head of the case and springs between the plates and heads of the plungers.

In testimony whereof I affix my signature in presence of two witnesses.

WILLIAM B. WAGGONER.

Witnesses:
 Eva B. Judd,
 Mary F. Lincoln.